(12) United States Patent
Mishra

(10) Patent No.: US 9,458,398 B2
(45) Date of Patent: Oct. 4, 2016

(54) HEAT RECOVERY SYSTEMS FOR BIOMASS GASIFICATION SYSTEMS

(75) Inventor: Niraj Kumar Mishra, Bangalore (IN)

(73) Assignee: General Electric Company, Schenectady, NY (US)

( * ) Notice: Subject to any disclaimer, the term of this patent is extended or adjusted under 35 U.S.C. 154(b) by 941 days.

(21) Appl. No.: 13/215,040

(22) Filed: Aug. 22, 2011

(65) Prior Publication Data
US 2013/0047573 A1 Feb. 28, 2013

(51) Int. Cl.
*C10J 3/26* (2006.01)
*C10K 1/02* (2006.01)

(52) U.S. Cl.
CPC .............. *C10K 1/026* (2013.01); *C10J 3/26* (2013.01); *C10J 2300/0909* (2013.01); *C10J 2300/0916* (2013.01); *C10J 2300/0956* (2013.01); *C10J 2300/165* (2013.01); *C10J 2300/1869* (2013.01); *C10J 2300/1884* (2013.01); *Y02P 20/13* (2015.11); *Y02P 20/145* (2015.11)

(58) Field of Classification Search
USPC .............. 48/89; 60/39.12, 645, 670, 680
See application file for complete search history.

(56) References Cited

U.S. PATENT DOCUMENTS

| 7,272,934 | B2* | 9/2007 | Chandran et al. ............. 60/781 |
| 7,981,835 | B2* | 7/2011 | Srinivasachar et al. ...... 502/423 |
| 8,372,169 | B2* | 2/2013 | Tsangaris et al. ............. 48/120 |
| 2008/0250714 | A1* | 10/2008 | Palonen et al. ......... 48/197 FM |
| 2009/0000301 | A1* | 1/2009 | Graham ........................ 60/645 |
| 2011/0203537 | A1* | 8/2011 | Prestel ............................. 123/3 |
| 2011/0314736 | A1* | 12/2011 | Crespin ......................... 48/202 |
| 2012/0055089 | A1* | 3/2012 | Kavanaugh et al. ............ 48/89 |

FOREIGN PATENT DOCUMENTS

| CH | 693 929 A5 | 4/2004 |
| EP | 1 203 802 A1 | 5/2002 |

OTHER PUBLICATIONS

Williams, R. H and Larson, E. D.; "Biomass Gasifier Gas Turbine Power Generating Technology"; Pergamon; Biomass and Bioenergy, vol. 10, Nos. 2-3, pp. 149-166, 1966.
"Technology of Biomass Gasification"; 5 pages.

* cited by examiner

*Primary Examiner* — Arun Goyal
(74) *Attorney, Agent, or Firm* — Fletcher Yoder, P.C.

(57) ABSTRACT

Biomass gasification systems including a reactor configured to gasify a dried biomass fuel in the presence of air to generate producer gas are provided. The biomass gasification systems also may include a heat exchanger adapted to transfer heat from the producer gas to a biomass feedstock to produce the dried biomass fuel and cooled producer gas.

25 Claims, 6 Drawing Sheets

HEAT RECOVERY SYSTEMS FOR BIOMASS GASIFICATION SYSTEMS

BACKGROUND OF THE INVENTION

The subject matter disclosed herein relates generally to gasification systems, and more particularly, to heat recovery systems for biomass gasification systems.

Gasification is a process that is often employed in various industries and applications for conversion of a lower, less readily usable type of fuel into a higher form of fuel. For example, biomass gasification systems are utilized in a variety of types of power plants to convert biomass into a more combustible form, referred to as producer gas. In some systems, the producer gas may be combusted by an engine to produce electricity. In other systems, the producer gas may be used to generate heat or to generate substitute natural gas (SNG).

Very generally, producer gas is a type of synthesis gas (syngas), formed by the relatively low temperature gasification of biomass, typically in the presence of air. The producer gas includes combustible gases, such as carbon monoxide, carbon dioxide, hydrogen, methane, and nitrogen, and can be combusted to generate power. Further, the producer gas can be utilized to make methanol, ammonia, and diesel fuel through known commercial catalytic processes. In such a way, various forms of organic waste, such as wood, coconut shell fibers, and alcohol fuels, may be gasified for use in the production of electricity for a variety of downstream applications. However, prior to use in a power generation system, the producer gas may need to be cooled to generate a gas mixture that has a temperature suitable for combustion. To that end, many current systems utilize a cooling and cleaning system to remove heat from the producer gas. However, this arrangement imposes a substantial cooling load requirement on the components of the cooling and cleaning system (e.g., scrubbers, filters, etc.), and the removed heat is often discarded as waste.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a biomass gasification system includes a reactor adapted to gasify a dried biomass fuel in the presence of air to generate producer gas. The biomass gasification system also includes a heat exchanger adapted to transfer heat from the producer gas to a biomass feedstock to produce the dried biomass fuel and cooled producer gas.

In a second embodiment, a biomass gasification system includes a reactor adapted to gasify a dried biomass fuel in the presence of air to generate producer gas. The reactor includes a primary air inlet adapted to direct a primary air stream into a feed section of the reactor and a secondary air inlet adapted to direct a heated air stream into a reaction zone of the reactor. The biomass gasification system also includes a first heat exchanger adapted to transfer heat from the producer gas to a third air stream to produce cooled producer gas and the heated air stream.

In a third embodiment, a biomass gasification system includes a reactor adapted to gasify a dried biomass fuel in the presence of air to generate producer gas. The biomass gasification system also includes a vessel disposed around a cyclone to create an interior volume between the cyclone and the vessel and adapted to transfer heat from the producer gas entering the cyclone to a biomass feedstock contained within the interior volume to produce the dried biomass fuel and cooled producer gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
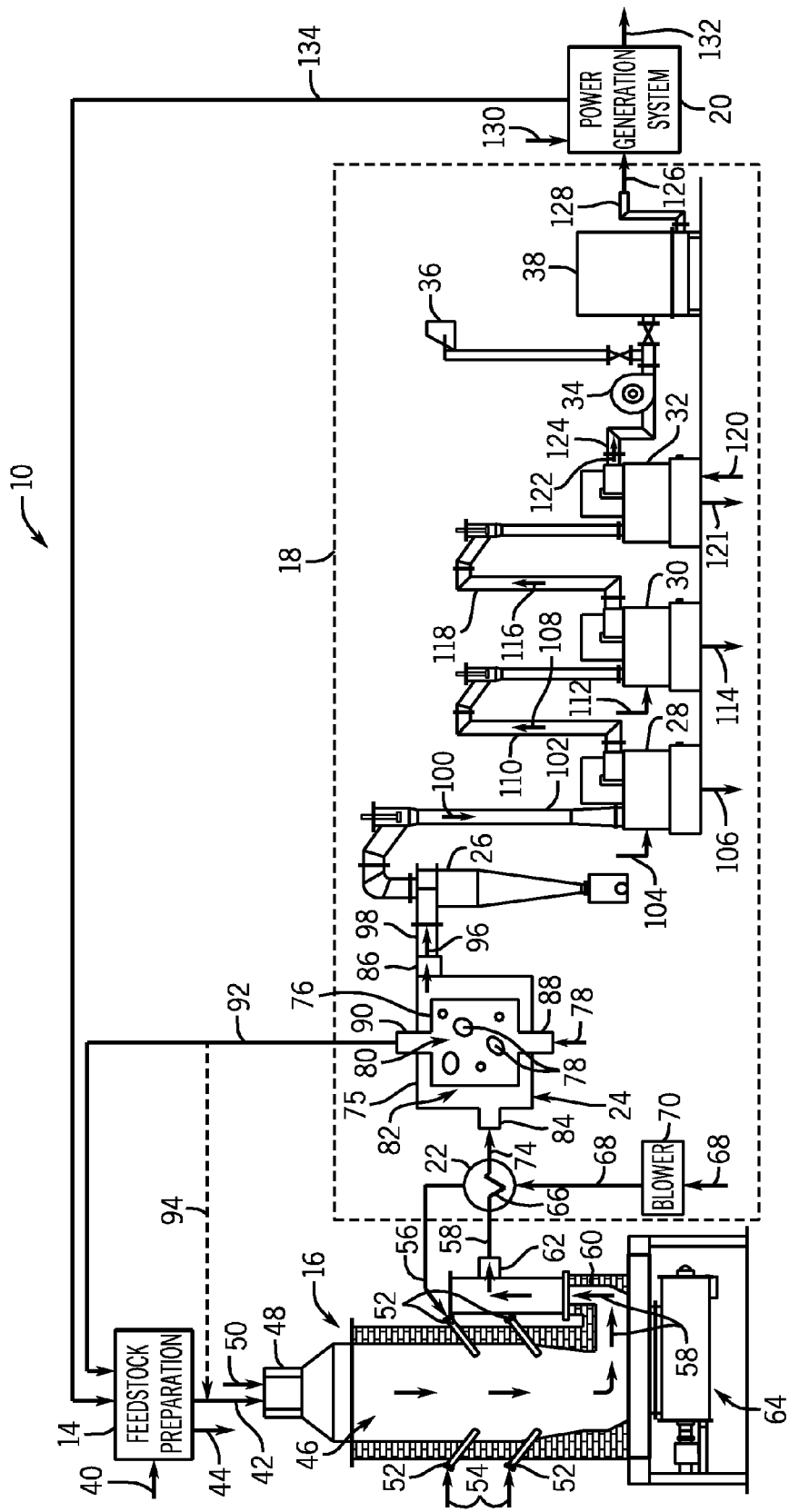
FIG. 1 is a block diagram of an embodiment of a biomass gasification system that employs heat from the producer gas to dry a biomass feedstock and to generate heated air for a biomass gasifier upstream of a cyclone in accordance with the present techniques.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to biomass gasification systems that employ heat from producer gas to dry biomass feedstock for the biomass gasifier and/or to generate heated air for the biomass gasifier. By utilizing heat from the producer gas for processes within the biomass gasification system, the overall efficiency of the gasification process may be increased. For example, in certain embodiments, the producer gas that exits the biomass gasifier has a relatively high temperature (e.g., approximately 400° C.-approximately 600° C.). The high temperature producer gas is subsequently cooled to a lower temperature (e.g., approximately 150° C.) prior to its utilization for power generation or other downstream processes. Rather than expelling the heat to the atmosphere as waste heat, the heat from the producer gas can be employed within the biomass gasification system, thereby increasing the efficiency of the gasification system. In particular, the heat differential between the hot producer gas exiting the gasifier and the cooled producer gas exiting the heat exchanger can be utilized to dry biomass serving as feedstock for the gasifier and/or to preheat air for the gasifier. As such, the foregoing features of presently disclosed embodiments may offer distinct advantages over traditional biomass gasification systems that typically do not utilize the removed heat, thus allowing the excess heat to become waste.

According to certain embodiments, the biomass gasification systems include one or more heat exchangers for transferring heat from the producer gas to air for the gasifier and/or to the biomass feedstock to dry the biomass feedstock. The disclosed heat exchangers can be utilized in biomass gasification systems to remove heat from the producer gas upstream and/or downstream from particulate removal equipment, such as cyclones and scrubbers that remove particulates from the producer gas. Further, in certain embodiments, the heat exchangers may be integrated with the particulate removal equipment. The heat exchangers can be designed to directly, or indirectly, transfer heat from the producer gas to other areas of the biomass gasification system. For example, a heat exchanger may be employed to transfer heat from the producer gas to another fluid, such as air, that is directed through the biomass feedstock and/or directed to the biomass gasifier. In another example, the producer gas may be directed through the jacket of a vessel that contains the biomass feedstock. In yet another example, the biomass feedstock may be directly exposed to the producer gas. Again, these and other features of the disclosed embodiments may offer benefits that arise from recovering the heat stored in the producer gas, rather than discarding the heat as waste. For example, in particular embodiments, by removing and utilizing the heat from the producer gas to reduce the moisture content of the biomass, the gasification process may be optimized to produce syngas having a higher calorific value. In another example, by utilizing the heat from the producer gas to preheat the air entering the biomass gasifier, the load on other heating systems used to preheat the air may be reduced.

Turning now to the drawings, FIG. 1 depicts a biomass gasification system 10 that is configured to thermally convert biomass into a more useful gaseous form of fuel (i.e., a fuel form that can be economically utilized with high energy recovery levels) and, subsequently, to clean and cool the gaseous fuel produced via the thermal conversion process. To that end, the biomass gasification system 10 includes a feedstock preparation unit 14, a biomass gasifier 16, a cleaning and cooling subsystem 18, and a power generation system 20. The cleaning and cooling subsystem 18 includes a heat exchanger 22, a vessel 24, a cyclone 26, a first scrubber 28, a second scrubber 30, a third scrubber 32, a blower 34, a flare 36, and a filter unit 38. Various conduits are provided that connect these components of the biomass gasification system 10 together, thereby enabling fluid flow between the components, as described in detail below. Further, although the illustrated cleaning and cooling subsystem 18 includes the heat exchanger 22, the vessel 24, the cyclone 26, and three scrubbers 28, 30, and 32, in other embodiments, the type and/or configuration of equipment included in the cleaning and cooling subsystem 18 may vary. For example, in other embodiments, multiple cyclones may be included, different numbers of scrubbers may be included, or the scrubbers and/or cyclone may be omitted. Further, in certain embodiments, the cleaning and cooling subsystem 18 may include multiple heat exchangers 22 and/or vessels 24 that may be disposed in series or in parallel to transfer heat from the hot producer gas from the gasifier 16 and to transfer heat from the producer gas for the drying of biomass and/or the heating of a desired fluid (e.g., air), as described in more detail below.

During operation of the biomass gasification system 10, biomass, as indicated by arrow 40, is utilized as a natural energy source to generate a more readily usable fuel form, such as producer gas. To that end, the biomass 40 may take the form of any natural or organic material having a molar energy content. For example, the biomass 40 may be a plant or any waste material derived from a plant, such as sawdust, wood waste, or agricultural waste. More particularly, the biomass 40 may include one or more of alfalfa straw, bean straw, barley straw, coconut shell, coconut husks, corn cobs, corn fodder, cotton stalks, peach pits, peat, prune pits, rice hulls, safflower, sugarcane, walnut shell, what straw, wood blocks, wood chips, or any other suitable organic feed material.

As discussed below, the biomass 40, in an unprocessed form, may have a moisture content that exceeds a desired level for efficient energy conversion during operation of the gasifier 16. For example, in one embodiment, the unprocessed biomass may be wood having a moisture content between approximately 10% and approximately 30%, and the desired moisture content for efficient gasifier performance may be less than approximately 10%. Because the composition of the producer gas that is generated in the biomass gasifier 16 and properties of the gasification reactions may be dependent on the moisture content of the biomass fuel form, it may be advantageous to reduce the moisture content of the biomass before entry into the gasifier 16. For example, additional fuel may be employed within the gasifier 16 to evaporate excess moisture in biomass that has a high moisture content, thus imposing an additional heat load that may affect gasifier performance. By utilizing the heat contained in the hot producer gas to dry the biomass before it is provided to the gasifier 16, the average energy conversion efficiency of the gasifier may be increased. That is, the calorific value of the biomass may be improved by drying the biomass, thereby increasing the energy conversion efficiency of the gasifier 16.

During operation, the biomass 40 is introduced into the biomass gasifier 16 through the feedstock preparation unit 14. Depending on the form of the incoming biomass 40, the feedstock preparation unit 14 may resize and/or reshape the biomass 40, for example, by chopping, milling, shredding, pulverizing, briquetting, or palletizing the biomass 40. In some embodiments, the feedstock preparation unit 14 may reduce the volume of the biomass 40 via densification to a uniformly dimensioned fungible fuel that is sized and shaped to maximize the efficiency of the gasifier 16. In other embodiments, the preparation unit 14 may receive the biomass 40 as a uniform fuel source and may further process the fuel to customize a processed feed 42 for compatibility with the given gasifier 16 (e.g., by reducing or increasing moisture content). In instances in which the biomass 40 is partially or completely dried, the feedstock preparation unit 14 may emit a dryer exhaust 44 as part of the drying process. It should be noted that as used herein, the term "dried biomass" refers to partially or completely dried biomass in which the moisture content of the biomass has been reduced. For example, in one embodiment, the dried biomass may have a moisture content of less than approximately 5%.

After processing in the feedstock preparation unit 14, the processed feedstock 42 enters a chamber 46 of the gasifier 16 via primary inlet 48, along with air 50. The depicted biomass gasifier 16 is an open-air gasifier where the primary inlet 48 enables the gasifier 16 to receive a substantially constant influx of air 50 and biomass feedstock 42. Further, although the gasifier 16 is depicted as a downdraft style gasifier, in other embodiments, a variety of suitable types of biomass gasifiers may be employed. For example, the disclosed embodiments are compatible with various types of gasifiers, such as updraft style gasifiers and crossdraft gasifiers. As may be appreciated, the gasifier type chosen for a given gasification system may be dictated by features of the biomass in its final fuel form, such as its size, moisture content, and ash content. For example, in embodiments where the biomass feed has substantial amounts of tar, such as wood, a downdraft gasifier may be chosen due to its relative insensitivity to the dust and tar content of the fuel as compared to updraft or crossdraft systems.

Within chamber 46, the processed feedstock 42 is gasified in the presence of air 50 to generate producer gas with varying concentrations of gases such as carbon monoxide, carbon dioxide, hydrogen, methane, and nitrogen. A series of reactions, which are collectively referred to as the gasification process, occur within the biomass gasifier 16. The process begins with combustion of the biomass feedstock 42 and the air 50. The biomass within the biomass feedstock 42 is combusted at sub-stoichiometric fuel-to-air ratios to produce, along with some carbon monoxide and hydrogen, carbon dioxide, water, and a char or ash bed, which contains hot carbon. The biomass gasifier 16 includes a plurality of air inlets 52 (e.g., nozzles) that are configured to allow air 54 to enter the biomass gasifier 16 to promote this combustion reaction. According to certain embodiments, the air inlets 52 may be spaced circumferentially around the biomass gasifier 16.

In some embodiments, heated air 56 may be injected into the chamber 46 via one or more of the air inlets 52 at an elevated temperature compared to the ambient air temperature. The heated air 56 may be produced, for example, by heating ambient air from the surrounding environment with the heat from the hot producer gas exiting the gasifier 16. That is, as described in more detail below, the heated air 56 may be produced by transferring heat from the producer gas to air flowing through the heat exchanger 22 to produce heated air 56. The heated air 56 may then be injected into the chamber 46 to partially combust the carbon content of the produced charcoal to yield carbon dioxide and heat. Further, the oxygen in the heated air 56 may react with the hydrogen in the biomass fuel to produce steam. As such, the efficiency of the combustion occurring in the gasifier may be improved by the injection of the heated air 56 via the air inlets 52.

The combustion reaction, which is an oxidation reaction, is exothermic and produces, in certain embodiments, temperatures within the biomass gasifier 16 of between approximately 1300 Kelvin (K) and 1600 K. As an example, the temperatures within the biomass gasifier 16 may reach approximately 1300 K, 1350 K, 1400 K, 1450 K, 1500 K, 1550 K, 1600 K, or more during the sub-stoichiometric combustion reaction. The carbon dioxide and water produced by the combustion reaction may pass through, or otherwise contact, the char or ash bed and undergo a reduction to generate carbon monoxide, hydrogen, and some methane.

The reduction reaction that is performed to produce the carbon monoxide and hydrogen is endothermic, and therefore requires heat. The bulk of the reduction reaction may therefore use heat produced by the combustion reaction, and also any latent heat from the hot char or ash bed. Moreover, because the biomass gasifier 16 is an open-top gasifier, the temperatures within the gasifier 16 may also be reduced by a substantially constant influx of the air 50. Other materials are generated from the gasification process in addition to the desired carbon dioxide and hydrogen gases, including tar.

The reduction reaction, as noted above, produces carbon monoxide, hydrogen, tar, and other gases (e.g., diluent $N_2$, acid gases), which collectively form an untreated producer gas mixture 58. The composition of the producer gas 58 is subject to considerable variations and depends on factors such as the fuel type, operational parameters of the biomass gasifier, and so forth, and may include varying concentrations of gases such as carbon monoxide, hydrogen, methane, carbon dioxide, and nitrogen. The untreated producer gas mixture 58 exits an outlet 60 of the biomass gasifier 16 at a temperature between approximately 600 and 1300 K, and all subranges therebetween. For example, the temperature at the outlet 60 may be approximately 600 K, 700 K, 800 K, 900 K, 1000 K, 1100 K, 1200 K, 1300 K, or more. The untreated producer gas mixture 58 is then directed through a conduit 62 for transmission to the cleaning and cooling subsystem 18.

Concurrent with the flow of the untreated producer gas mixture 58 through the outlet 60 of the gasifier 16, hot ash exits the gasifier 16 via an ash extraction system 64. The hot ash may be derived from the mineral content of the fuel that remains in oxidized form. The ash extraction system 64 receives the hot ash generated during the biomass gasification process and contains the hot ash for subsequent removal from the biomass gasifier 16. If desired for the given application, one or more heat exchangers may be placed in the ash extraction system 64 to cool the hot ash via convection.

While the hot ash is removed via the ash extraction system 64, the untreated producer gas mixture 58 flows through conduit 62 to the heat exchanger 22. As the producer gas mixture 58 flows through the heat exchanger 22, the producer gas mixture 58 transfers heat to ambient air 68 that is directed through the heat exchanger 22 by a blower 70. As heat is transferred from the producer gas mixture 58 to the ambient air 68, the producer gas mixture 58 is cooled to generate cooled producer gas 74, and the ambient air 68 is heated to produce the heated air 56. After exiting the heat exchanger 22, the heated air 56 may be injected into the gasifier 16 to facilitate the combustion reaction occurring therein.

According to certain embodiments, the heat exchanger 22, as well as the other heat exchangers described herein, may be a plate fin heat exchanger, a plate and frame heat exchanger, a shell and tube heat exchanger, or any suitable type of heat exchanger capable of transferring heat from one fluid to another. For example, in one embodiment of the depicted design, the heat exchanger 22 may be configured as a double pipe arrangement having one pipe concentrically located within another pipe of a larger diameter. Further, the inner pipe may have one or more fins or corrugations that function to increase the available heat transfer area during operation. However, in other embodiments, the design of the heat exchanger 22 may vary, depending on operational or system constraints, such as the space available in the gasification plant, the type of biomass being utilized, and so forth. Further, the heat exchangers may include single or multi-pass heat exchangers, and may be arranged in a parallel flow, crossflow, or counterflow arrangement.

The heated air 56 from the heat exchanger 22 is directed to the gasifier 16, while the producer gas 74 is directed to the vessel 24 for further cooling. Vessel 24 includes an outer vessel 75 (e.g., a jacket portion) that jackets or surrounds an inner vessel 76 to form an exterior volume 82 between the inner vessel 76 and the outer vessel 75. Inner vessel 76 includes an interior volume 80 that contains biomass 78, which may be suspended in a suitable fluid (e.g., air). The producer gas 74 enters the exterior volume 82 of the vessel 24 through inlet 84, circulates through the exterior volume 82, and exits the vessel 24 via outlet 86. The biomass 78 enters the inner vessel 76 through an inlet 88, flows through the interior volume 80, and exits through an outlet 90. Further, in certain embodiments, the biomass 78 may be retained within the interior volume 80 for a certain residence time, which may vary depending on factors such as the moisture content of the biomass 78 and the temperature of the producer gas 74, among others.

As the producer gas 74 flows through the exterior volume 82, the producer gas 74 transfers heat to the inner vessel 76 to heat the biomass 78 contained within interior volume 80. According to certain embodiments, the inner vessel 76 may be constructed of a heat conducting material, such as sheet metal. As the biomass 78 is heated, moisture within the biomass 78 may evaporate to produce dried biomass 92. According to certain embodiments, the moisture content of the biomass 78 may be reduced by at least approximately 10%-50%, and all subranges therebetween. As the producer gas 74 transfers heat to the inner vessel 76, the producer gas 74 may be cooled to produce cooler producer gas 96.

The dried biomass 92 can then be provided to the feedstock preparation unit 14. For example, in certain embodiments, the dried biomass 92 can be supplied directly to the feedstock preparation unit 14 from the vessel 76, as indicated by arrow 92, or can be mixed with the biomass 40 prior to entering the feedstock preparation unit 14. In these embodiments, the biomass 40 and the dried biomass 92 can be processed in the feedstock preparation unit 14 and can then be directed to the gasifier 16 as processed feed 42. In other embodiments, however, the dried biomass 92 can be provided directly to the gasifier 16. For example, as shown by arrow 94, the dried biomass 92 can be combined with the biomass exiting the feedstock preparation unit 14 as processed feed 42 and then the biomass feedstock and the dried biomass 92 can be directed to the gasifier 16. In these embodiments, the dried biomass 92 may not be processed in the feedstock preparation unit 14 prior to entering the gasifier 16. Further, in other embodiments, the dried biomass 92 may be directed to the gasifier 16 as a separate feed that is not combined with other forms of biomass prior to entering the gasifier 16.

It should be noted that the relatively low moisture content of the dried biomass 92 as compared to the biomass 78 may increase the efficiency of the gasification process occurring in the gasifier 16. For example, the calorific content of the producer gas generated by the gasifier 16 when the biomass feed has a reduced moisture content may be higher than when the biomass feed has an elevated moisture content. Still further, the efficiency of the overall process performed by the gasification system 10 also may be increased when the dried biomass 92 is produced though utilization of the heat contained in the producer gas. For example, by removing and utilizing the heat in the producer gas before and/or during cleaning instead of discarding the heat as waste, the cooling load requirement imposed on downstream cleaning components may be reduced.

While the dried biomass 92 is directed toward the gasifier 16 for gasification, the cooled producer gas mixture 96 (i.e., producer gas mixture 96 has a substantially lower temperature than producer gas mixture 74) flows through the outlet 86 and a conduit 98 to the cyclone 26. The cyclone 26 may remove dust and other particles from the cooled producer gas mixture 96 to produce a producer gas mixture 100 that contains fewer particulates than producer gas mixture 58. From the cyclone 26, the producer gas mixture 100 flows through a conduit 102 to the first scrubber 28 where the producer gas is scrubbed to remove fines, tar, and entrained gases, such as hydrogen chloride. In particular, within the first scrubber 28, fines and tar may be separated from the producer gas with water, as indicated by arrow 104, to produce a stream of black water that exits a bottom portion of the first scrubber 28, as indicated by arrow 106. The scrubbed producer gas 108 exits the first scrubber 28 and is transferred to the second scrubber 30 via a conduit 110.

In the second scrubber 30, additional fines, tar, and gases may be removed with water 112. The fines and tar may be separated from the producer gas to produce a second stream of black water 114 that may exit a bottom portion of the second scrubber 30. According to certain embodiments, the black water 106 and 114 exiting the bottom portions of the first scrubber 28 and the second scrubber 30, respectively, may be directed to a black water processing system. In such embodiments, the black water processing system may include a series of flash tanks that subject the black water 106 and 114 to a series of pressure reductions to remove dissolved gases and to separate and/or concentrate the fines. The separated fines may be recycled and used in the feedstock preparation unit 14 to provide additional fuel for the biomass gasifier 16 if desired.

The scrubbed producer gas 116 exiting the second scrubber 30 flows through a conduit 118 to the third scrubber 32, which, in certain embodiments, may be a chilled water scrubber. In the third scrubber 32, the producer gas may be cooled with chilled water 120 that flows into the third scrubber 32, exchanges heat with the hot producer gas, and, subsequently, flows back to a chilled water tank where the water is cooled for recirculation. The chilled water 120, which is atomized in the scrubber 32, also scrubs the producer gas 116 to remove a substantial portion of any particulates that may be present. Therefore, the chilled water 120 may absorb or otherwise entrain particulates, as well as acid gases and the like, to produce a grey water 121. The grey water 121 may be sent to a chilled water tank, a water treatment facility, or a similar plant feature.

The cooled producer gas 122 flows through a conduit 124 to the blower 34. The blower 34 is operated to pull the producer gas 58, 96, 100, 108, 116, and 122 from the biomass gasifier 16 through the gas cleaning and cooling subsystem 18. During operation, in certain embodiments, an excess portion of the producer gas may be burned by the flare 36. The producer gas 122 that is not directed to the flare 36 flows from the blower 34 to the filtering unit 38. The filtering unit 38 includes one or more filters configured to extract particulates from the producer gas while allowing the gas in which the particulates are suspended to flow. For example, in some embodiments, the filtering unit 38 may include one or more filters that are designed to remove fine particulates (e.g., particulates smaller than approximately 1-10 micrometers) from the producer gas.

The filtered producer gas 126 is directed through conduit 128 from the gas cleaning and cooling subsystem 18 to the power generation system 20 where the producer gas 126 may be utilized to produce power. In certain embodiments, the filtered producer gas 126 may have a reduced temperature (e.g., less than approximately 150° C.) as compared to the elevated temperature (e.g., approximately 400° C.-approximately 600° C., and all sub-ranges therebetween) of the producer gas 58. For example, the power generation system 20 may include a gas engine (e.g., gas turbine or internal combustion engine) or a reciprocating engine that combusts the producer gas with air 130 to produce power for a downstream application, as indicated by arrow 132. In certain embodiments, this power may be used to directly operate other systems and/or to provide power to a utility grid. During combustion, the gas engine also may generate engine exhaust 134, which may be used to dry feedstock in the preparation unit 14, in some embodiments.

Figure 2:
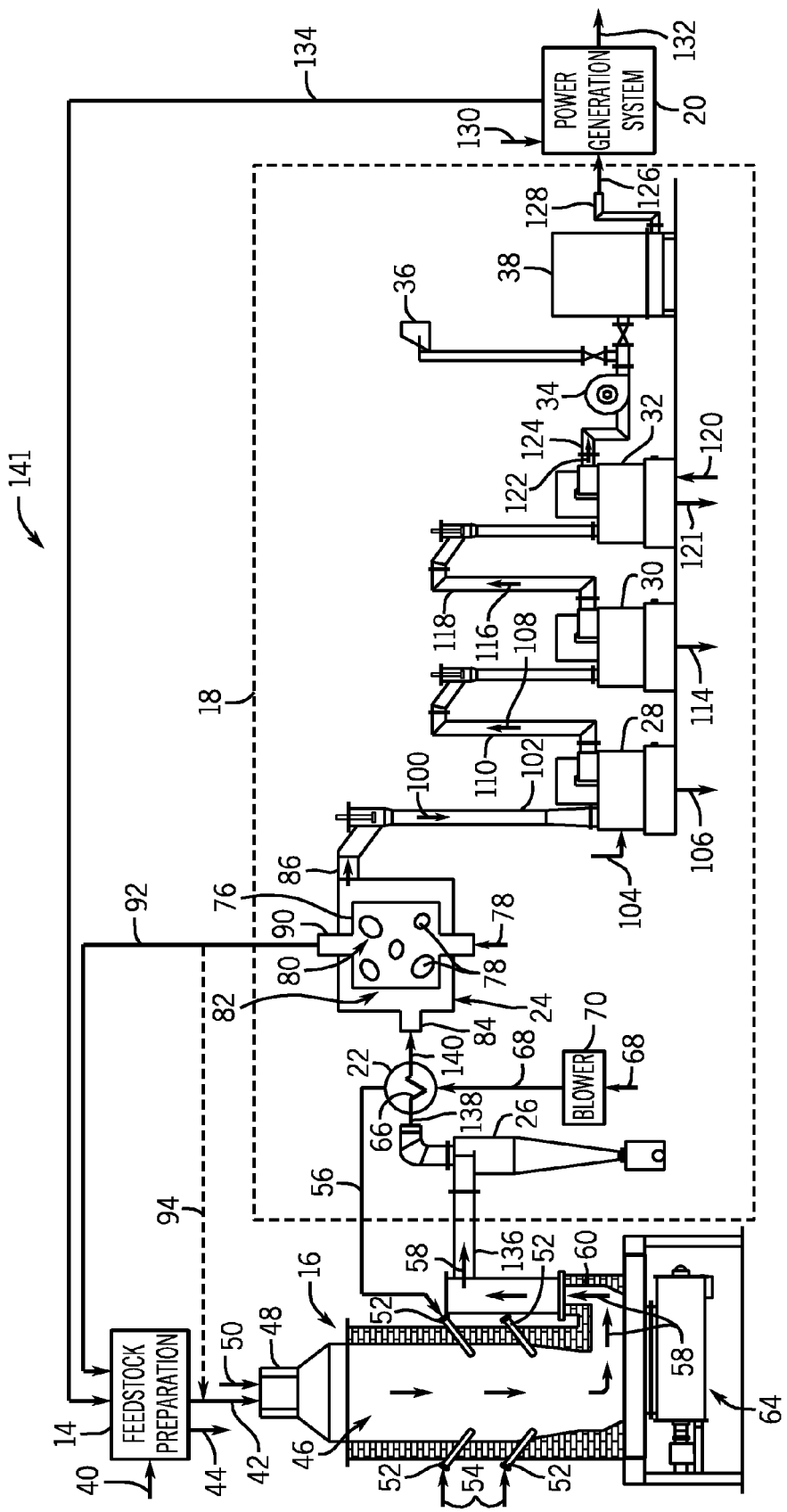
FIG. 2 is a block diagram of an embodiment of a biomass gasification system that employs heat from the producer gas to dry a biomass feedstock and to generate heated air for a biomass gasifier downstream of a cyclone in accordance with the present techniques.

It should be noted that the placement of the heat exchanger 22 and the vessel 24 within the cleaning and cooling subsystem 18 may vary. For example, in FIG. 1, the heat exchanger 22 and the vessel 24 receive hot producer gas 58 from the gasifier 16 and output cooled producer gas 96 to the cyclone 26 for further processing. However, in the embodiment of a gasification system 141 shown in FIG. 2, the heat exchanger 22 and the vessel 24 are placed in the cleaning and cooling subsystem 18 such that the particulate content of the hot producer gas is reduced by the cyclone 26 before the producer gas is cooled by the heat exchanger 22 and the vessel 24. As such, the producer gas from the gasifier 16 is filtered prior to heat removal in the heat exchanger 22 and the vessel 24. In certain embodiments, the foregoing arrangement of the components downstream of the cyclone 26 may offer one or more advantages. For example, in some embodiments, it may be desirable to cool the producer gas after particulates have been removed in the cyclone 26 to reduce or eliminate the possibility of the producer gas temperature being reduced to a level below the dew point of the tar in the producer gas More specifically, during operation of the embodiment of FIG. 2, the biomass feedstock 42 is provided to the gasifier 16, where the feedstock is gasified in the presence of air to generate hot producer gas 58 that exits the outlet 60 of the gasifier at a substantially elevated temperature (e.g., approximately 500K-approximately 600K). The hot producer gas mixture 58 flows through a conduit 136 to the cyclone 26, which may be operated to remove dust and other particles from the hot producer gas mixture 58. After the particulate content of the hot producer gas mixture 58 is reduced in the cyclone 26, a reduced particulate producer gas mixture 138 is directed to the heat exchanger 22. Within the heat exchanger 22, the producer gas mixture 138 may transfer heat to the ambient air 68 to generate the heated air 56 that is directed to the gasifier 16. As the producer gas mixture 138 transfers heat to the ambient air 68, the producer gas mixture 138 is cooled to form cooled producer gas 140.

While the heated air 56 is directed toward the gasifier 16, the reduced cooled producer gas 140 is directed to the vessel 24 for additional cooling. As before, the producer gas 140 enters the exterior volume 82 of the vessel 24 via inlet 84. As the producer gas 140 travels through the exterior volume 82, the biomass 78 is heated, and the moisture content of the biomass 78 is reduced, thereby producing dried biomass 92 at the outlet 90 of the vessel 76. Again, the dried biomass 92 may be supplied to the gasifier 16 either upstream or downstream of the feedstock preparation unit 14. Concurrently, the cooled and reduced particulate producer gas mixture 100 flows through outlet 86 and conduit 102 for further processing in the scrubbers 28, 30, and 32, as described above with respect to FIG. 1

Figure 3:
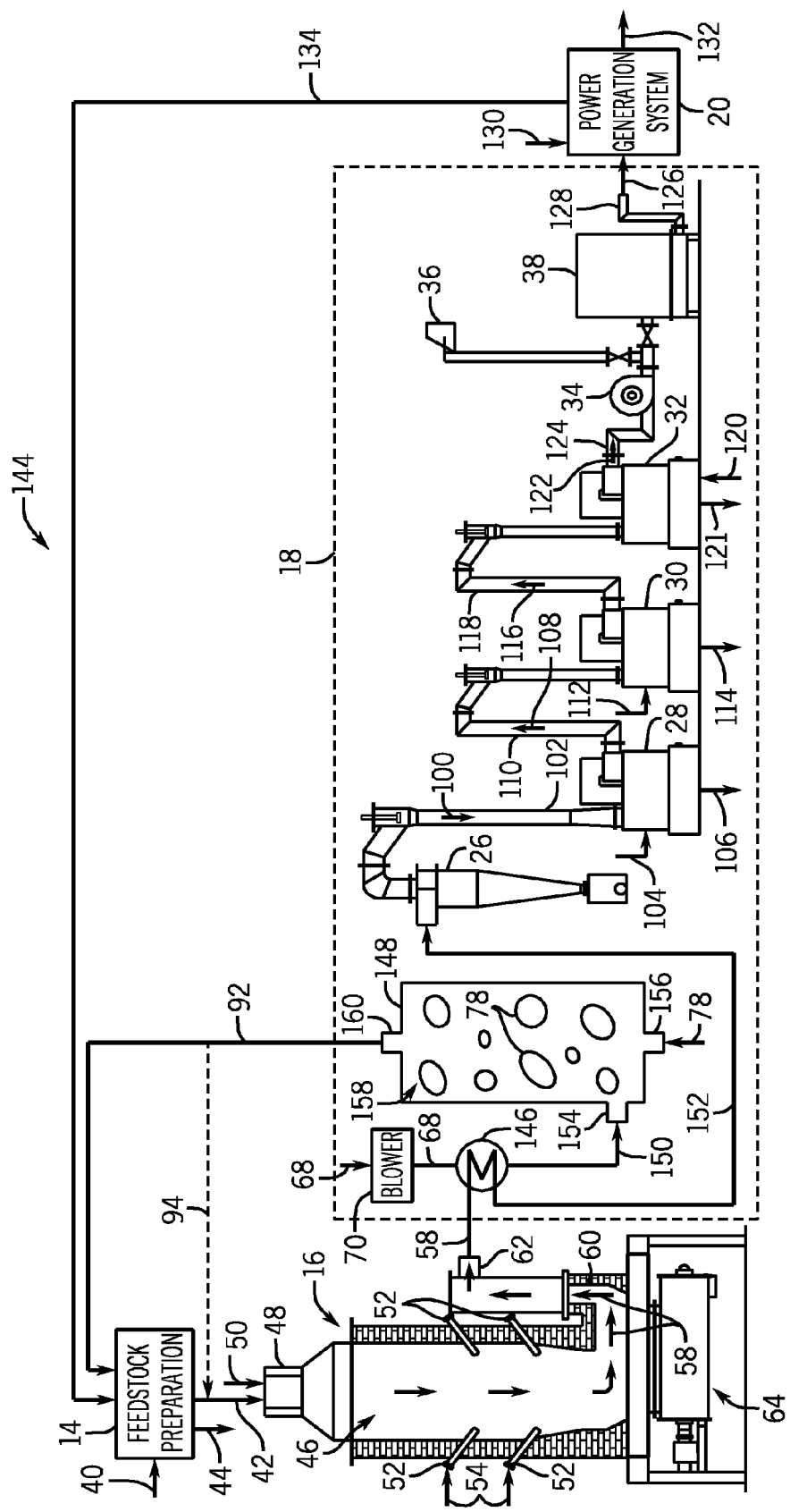
FIG. 3 is a block diagram of another embodiment of a biomass gasification system that employs heat from the producer gas to dry a biomass feedstock and to generate heated air for a biomass gasifier upstream of a cyclone in accordance with the present techniques.

FIG. 3 depicts another embodiment of a biomass gasification system 144. Similar to the gasification systems 10 and 141, the biomass gasification system 144 of FIG. 3 includes the feedstock preparation unit 14, the biomass gasifier 16, the cleaning and cooling subsystem 18, and the power generation system 20. However, in this embodiment, the cleaning and cooling subsystem 18 includes a heat exchanger 146 and a vessel 148, in addition to the previously described cyclone 26, scrubber 28, scrubber 30, scrubber 32, blower 34, flare 36, and filter unit 38.

Within the gasifier 16, the processed biomass feedstock 42 is thermally converted into the producer gas mixture 58 that exits the outlet 60 of the gasifier 16 at an elevated temperature. The hot producer gas mixture 58 flows through conduit 62 to the heat exchanger 146. As the producer gas mixture 58 flows through the heat exchanger 146, the producer gas mixture 58 transfers heat to the ambient air 68 that is directed through the heat exchanger 146 by the blower 70. The ambient air 68 absorbs heat from the producer gas 58 to produce heated air 150 and cooled producer gas 152.

The cooled producer gas mixture 152 is directed through the cyclone 26, the scrubbers 28, 30, and 32, and the filter unit 38 to the power generation system 20. The heated air 150 flows through an inlet 154 into a chamber 158 in the vessel 148, which contains the biomass 78. The biomass 78 may be suspended in a fluid (e.g., air), and may flow through an inlet 156 into the chamber 158 of the vessel 148. Within the chamber 158, the heated air 56 directly contacts the biomass 78 to heat the biomass 78 and remove moisture. That is, via direct contact with heated air 56, the biomass 78 is dried prior to exiting through an outlet 160 of the vessel 148. As the heated air 56 circulates toward outlet 160, the dried biomass 92 is propelled toward the outlet 160 of the vessel 148. For example, after exiting the vessel 148, the dried biomass 92 is propelled toward the gasifier 16, for example, via the feedstock preparation unit 14. Alternatively, a portion of the dried biomass or the biomass in its entirety may be mixed with the processed feedstock 42 prior to entering the gasifier 16, as shown by arrow 94. By removing and utilizing the heat from the producer gas in this manner to produce the dried biomass 92 having a reduced moisture content, the gasification of the biomass feed may be optimized to generate producer gas having an increased calorific value.

It should be noted that placement of the heat exchanger 146 and the vessel 148 within the cleaning and cooling subsystem 18 may vary in certain embodiments. For example, similar to the embodiment of FIG. 2, the particulate content of the hot producer gas 58 may be reduced by the cyclone 26 before the producer gas is cooled and the removed heat is utilized for the drying of biomass and/or the heating of air. In some embodiments, this placement may be desirable to enable cooling of the producer gas after particulates have been removed in the cyclone to reduce or eliminate the possibility of the producer gas temperature being reduced to a level below the dew point of the tar in the producer gas. That is, in certain embodiments, it may be desirable to maintain the producer gas at an elevated temperature during the particulate removal process occurring in the cyclone 26, and to remove and recover heat from the producer gas after the particulate level has been reduced.

Figure 4:
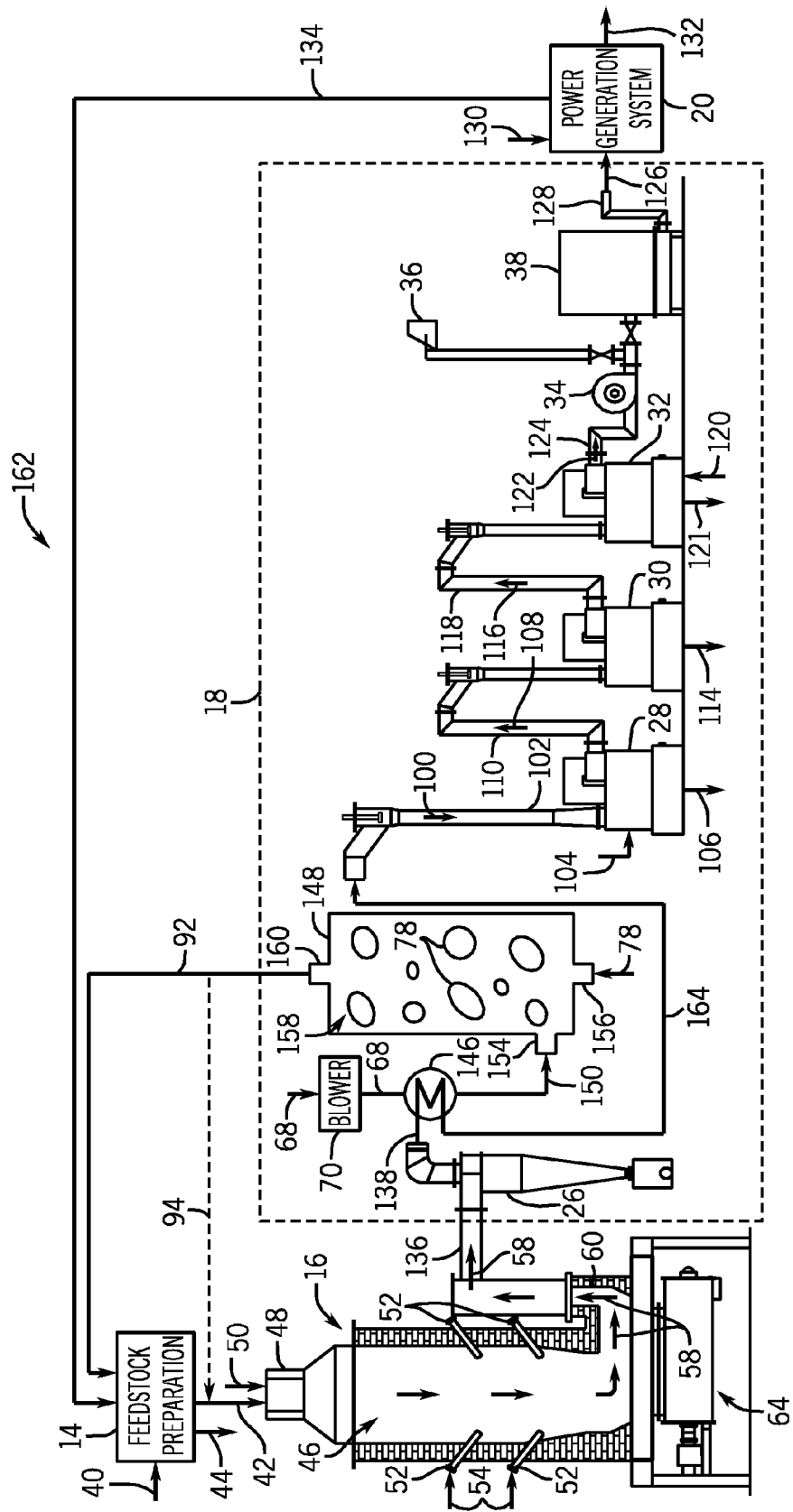
FIG. 4 is a block diagram of another embodiment of a biomass gasification system that employs heat from the producer gas to dry a biomass feedstock and to generate heated air for a biomass gasifier downstream of a cyclone in accordance with the present techniques.

Specifically, in the gasification system 162 of FIG. 4, the hot producer gas 58 from the gasifier 16 is directed through the cyclone 26 to produce a reduced particulate producer gas 138 that is then directed to the heat exchanger 146. The reduced particulate producer gas 138 transfers heat to the ambient air 68 flowing through the heat exchanger 146 to produce the heated air 150 that is directed to the vessel 148. As the reduced particulate producer gas 138 transfers heat to the ambient air 68, the reduced particulate producer gas is cooled to produce cooled producer gas 164 that is directed to the scrubber 28 where further processing may occur, as described above with respect to FIG. 3. Concurrently, the heated air 150 is directed to chamber 158 where the heated air 150 heats the incoming biomass mixture 78, thus producing biomass 92 with a reduced moisture content. Here again, the dried biomass 92 may be directed to the feedstock preparation unit 14 and/or to the prepared feedstock 42 fro entry into the gasifier 16.

Figure 5:
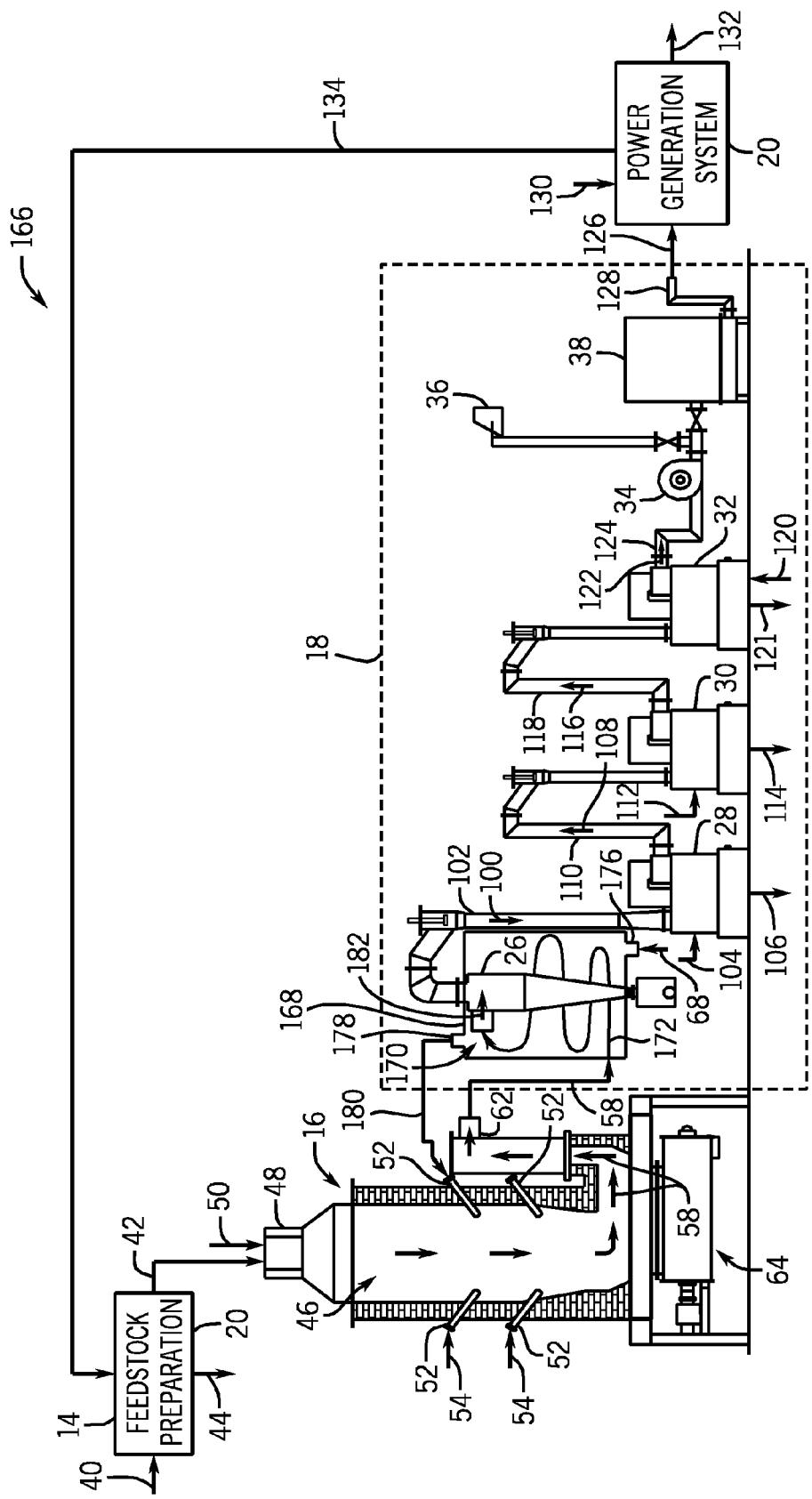
FIG. 5 is block diagram of an embodiment of a biomass gasification system that employs heat from the producer gas to generate heated air for a biomass gasifier in accordance with the present techniques.

FIG. 5 depicts another embodiment of a biomass gasification system 166. In the depicted embodiment, the cleaning and cooling subsystem 18 of the biomass gasification system 166 includes the cyclone 26, the scrubbers 28, 30, and 32, the blower 34, the flare 36, and the filtering unit 38, which operate as described above with respect to FIGS. 1 to 4. However, the embodiment depicted in FIG. 5 also includes a vessel 168 (e.g., a jacket portion) disposed about the cyclone 26. The vessel 168 separates the surrounding environment from the cyclone 26 to form an interior chamber 170 between the outer wall of the cyclone 26 and the vessel 168. A heat exchanger coil 172 is disposed within the chamber 170 to direct the producer gas mixture 58 exiting the gasifier 16 through the chamber 170 and into the cyclone 26. In other words, the producer gas mixture 58 flows through the coil 172 into the cyclone 26 to enable heat transfer in the chamber 170.

The gasifier 16 receives processed biomass feedstock 42 from the feedstock preparation unit 14 and converts this feedstock to the hot producer gas mixture 58. The hot producer gas 58 flows through the outlet 62 of the gasifier 16 to the heat exchanger coil 172 disposed within the vessel 168. As the hot producer gas 58 flows through the heat exchanger coil 172, the hot producer gas 58 transfers heat to ambient air 68 flowing through the chamber 170 to produce cooled producer gas 182. In particular, ambient air 68 enters an air inlet 176 of the vessel 168, flows through the chamber 170 where the ambient air 68 is heated by the producer gas 58, and exits the chamber 170 through an outlet 178 as heated air 180. The heated air 180 is directed to one or more of the air inlets 52 of the gasifier 16, where the heated air 180 may be injected into the gasification chamber 46 to facilitate the combustion reaction occurring therein. In this way, heat from the producer gas 58 is transferred to ambient air 68 to produce heated air 180, thus utilizing the heat in the producer gas 58 to increase the efficiency of the biomass gasification process.

While the heated air 180 is directed toward the gasifier 16 for use in the gasification chamber 46, the cooled producer gas 182 is directed to the cyclone 26 for particulate removal and further processing, as described above with respect to FIGS. 1-4. In the depicted embodiment, the hot producer gas 58 has a substantially elevated temperature as compared to the cooled producer gas 182. That is, the temperature of the producer gas mixture 58 is reduced as the producer gas 58 travels through the heat exchanger coil 172 and heat is transferred to the ambient air 68. The foregoing feature may have the effect of reducing the cooling load imposed on the downstream components of the cleaning and cooling subsystem 18. For example, by removing heat from the producer gas mixture 58 before the mixture is processed by the scrubbers 28, 30, and 32, the cooling load requirement imposed on the scrubbers may be lowered, thereby further increasing the efficiency of the biomass gasification system 166.

Figure 6:
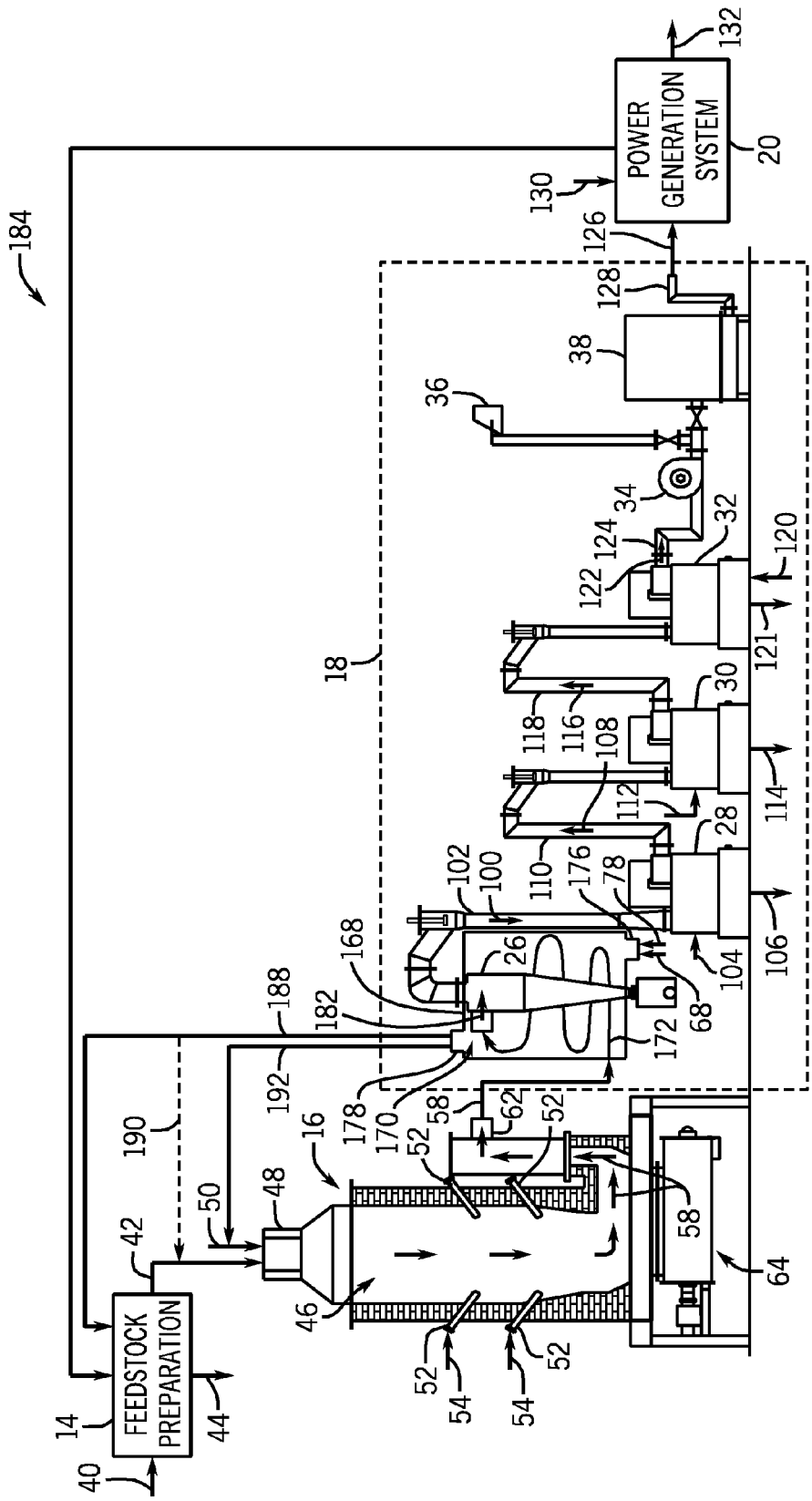
FIG. 6 is block diagram of an embodiment of a biomass gasification system that employs heat from the producer gas to dry a biomass feedstock in accordance with the present techniques.

FIG. 6 depicts another embodiment of a biomass gasification system 184. The biomass gasification system 184 is generally similar to the biomass gasification system 166 of FIG. 5. However, in addition to directing ambient air 68 through the chamber 170 of vessel 148, biomass 78 also may flow through the chamber 170. For example, in the embodiment of FIG. 6, the vessel 168 intakes both ambient air 68 and the biomass 78 through the inlet 176. As the ambient air 68 and the biomass 78 flow through the chamber 170 toward the outlet 178, the ambient air 68 and the biomass 78 are heated by the hot producer gas 58 flowing through the heat exchanger coil 172. Therefore, in the chamber 170, the heat stored in the producer gas 58 is transferred both to the ambient air 68 and the biomass 78 to produce heated air 192 and dried biomass 188.

As before, the dried biomass 188 may be provided to the gasifier 16 either upstream or downstream of the feedstock preparation unit 14. For example, in certain embodiments, the dried biomass 188 may be mixed with biomass 40 prior to entering the feedstock preparation unit 14, processed in the feedstock preparation unit 14, and then directed to the gasifier 16 as processed feed 42. For further example, in other embodiments, the dried biomass 188 may be provided directly to the gasifier 16, as indicated by arrow 190. That is, the dried biomass 188 may be combined with the biomass exiting the feedstock preparation unit 14, and the mixture of the processed feed and the dried biomass may be directed to the gasifier 16.

The heated air 192 also may exit the outlet 178 of the vessel 168 and may be directed to the gasifier 16 via the inlet 48 for use in the gasification chamber 46, for example, to facilitate the combustion reaction occurring therein. Again, by utilizing the heat from the producer gas to generate the heated air 192, the stored heat may be recovered and utilized to increase the efficiency of the gasification process instead of being discarded as waste. In the depicted embodiment, the heated air 192 is combined with the air 50 before being directed to the gasifier 16. However, it should be noted that portions of the heated air 192 may be combined with air 50 and/or air 54 before being injected into the gasifier 16 or may be separately injected. Further, the heated air 192 may be injected into the gasifier 16 via the inlet 48, one or more of the air inlets 52, or a separately provided air inlet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A biomass gasification system, comprising:
   a reactor having an internal chamber, wherein the reactor is configured to gasify a biomass feedstock in the presence of aft to generate a producer gas;
   a first neat exchanger external from the reactor and separate from the internal chamber, wherein a flow path of air passes through the first heat exchanger and passes to the reactor, a flow path of the producer gas passes downstream from the reactor and through the first heat exchanger, and the first heat exchanger is configured to transfer heat from a first position along the flow path of the producer gas to the flow path of air; and
   a second heat exchanger external from the reactor and separate from the internal chamber, wherein the flow path of the producer gas passes downstream from the first heat exchanger and through the second heat exchanger, a flow path of the biomass feedstock passes through the second heat exchanger and passes to the reactor, and the second heat exchanger is configured to transfer heat from a second position along the flow path of the producer gas to the flow path of the biomass feedstock to dry the biomass feedstock and cool the producer gas, wherein the first position and the second position are located along the flow path of the producer gas downstream from the reactor and upstream from all of at least one scrubber or a filter unit.

2. The biomass gasification system of claim 1, wherein the second heat exchanger is configured to transfer heat from the flow of the producer gas to a flow path of a fluid to produce a heated fluid, and comprising a vessel configured to hold the biomass feedstock and to direct the heated fluid through the biomass feedstock.

3. The biomass gasification system of claim 1, wherein the dried biomass comprises biomass having a moisture content of less than 5%.

4. The biomass gasification system of claim 1, wherein the second heat exchanger comprises a jacketed heat exchanger having a jacket portion configured to receive with the flow path of the producer gas and a vessel portion configured to hold the biomass feedstock, wherein the jacket portion is disposed about the vessel portion.

5. The biomass gasification system of claim 1, comprising a cyclone configured to separate particulates from the producer gas cooled by at least one of the first heat exchanger or the second heat exchanger.

6. The biomass gasification system of claim 5, wherein the second heat exchanger is a jacketed heat exchanger surrounding the cyclone.

7. The biomass gasification system of claim 1, comprising a combustion engine coupled to a generator, wherein the combustion engine is configured to combust the producer gas cooled by at least one of the first heat exchanger or the second heat exchanger to drive the generator.

8. The biomass gasification system of claim 1, comprising:
   a cyclone configured to separate particulates from the producer gas cooled by at least one of the first heat exchanger or the second heat exchanger to generate a reduced particulate producer gas; and
   a scrubber system configured to scrub the reduced particulate producer gas and to further cool the reduced particulate producer gas.

9. The biomass gasification system of claim 1, wherein the second heat exchanger comprises an inlet and an outlet, the inlet is in fluid communication with the flow path of the producer gas at the first position downstream from the reactor and upstream from a position from all of the at least one scrubber or the filter unit, and the outlet is in fluid communication with the flow path of the producer gas at the second position, downstream from first position.

10. The biomass gasification system of claim 9, comprising the at least one scrubber, wherein the inlet of the second heat exchanger is in fluid communication with the flow path of the producer gas at the first position downstream from the reactor and upstream from the position of all of the at least one scrubber.

11. The biomass gasification system of claim 10, wherein the at least one scrubber comprises a first scrubber and a second scrubber.

12. The biomass gasification system of claim 10, wherein the at least one scrubber comprises a first scrubber, a second scrubber, and a third scrubber.

13. The biomass gasification system of claim 9, comprising the at least one scrubber and the filter unit disposed downstream of the second heat exchanger.

14. The biomass gasification system of claim 13, wherein the filter unit is disposed downstream of the at least one scrubber.

15. The biomass gasification system of claim 9, wherein the flow path of the producer gas extends through the first heat exchanger and the second heat exchanger prior to entering an exhaust treatment system.

16. The biomass gasification system of claim 1, wherein the first heat exchanger is external from the reactor and separate from the internal chamber, wherein the first heat exchanger comprises an inlet and an outlet, the inlet is in fluid communication with the flow path of the producer gas at the first position downstream from the reactor and upstream from all of the at least one scrubber or the filter unit, and the outlet is in fluid communication with the flow path of the producer gas at the second position downstream from the first position.

17. The biomass gasification system of claim 1, wherein the first heat exchanger and the second heat exchanger are configured to mount in-line with the flow path of the producer gas downstream from the reactor and upstream from all of the at least one scrubber or the filter unit.

18. The biomass gasification system of claim 1, wherein a first inlet of the first heat exchanger and a second inlet of the second heat exchanger are configured to receive an entirety of the producer gas along the flow path.

19. A biomass gasification system, comprising:
   a reactor having an internal chamber, wherein the reactor is configured to gasify a biomass feedstock to generate a producer gas;
   a first heat exchanger external from the reactor and separate from the internal chamber, wherein the first heat exchanger comprises a first main flow net and a first main flow outlet;
   a second heat exchanger external from the reactor and separate from the internal chamber, wherein the second heat exchanger comprises a second main flow inlet, a second main flow outlet, a feedstock inlet, and a feedstock outlet, wherein the first main flow inlet and the second main flow net are in fluid communication with a main flow path of the producer gas at a respective first position and a second position downstream from the reactor and upstream from all of at least one scrubber or a filter unit, the first main flow outlet and the second main flow outlet are in fluid communication with the main flow path of the producer gas at a respective third position and a fourth position downstream from the first position and the second position, wherein the second heat exchanger is configured to pass a solid feedstock along a feedstock passage from the feedstock inlet to the feedstock outlet and into the reactor.

20. The system of claim 19, wherein the first heat exchanger and the second heat exchanger are configured to mount in-line with the main flow path of the producer gas downstream from the reactor and upstream from all of the at least one scrubber or the filter unit.

21. The system of claim 19, wherein the first main flow inlet of the first heat exchanger is configured to receive an entirety of the producer gas from the main flow path.

22. A biomass gasification system, comprising:
a gasifier having an internal chamber, wherein the reactor is configured to gasify a biomass feedstock to generate a producer gas;
a first heat exchanger external from the gasifier and separate from the internal chamber, wherein the first heat exchanger comprises a first main flow inlet and a first main flow outlet;
a second heat exchanger external from the gasifier and separate from the internal chamber, wherein the second heat exchanger comprises a second main flow inlet, a second main flow outlet, a feedstock inlet, and a feedstock outlet, wherein the first main how inlet and the second main flow inlet are along a main flow path of the producer gas at a respective first position and a second position downstream from the gasifier and upstream from all of at least one scrubber or a filter unit, and the first main flow outlet and the second main flow outlet are along the main flow path of the producer gas at a respective third position and a fourth position downstream from the first position and the second position, wherein the second heat exchanger is configured to pass a solid feedstock along a feedstock passage from the feedstock inlet to the feedstock outlet and into the gasifier.

23. The system of claim 22, wherein the first heat exchanger and the second heat exchanger are configured to mount in-line with the main flow path of the producer gas downstream from the gasifier.

24. The system of claim 22, wherein the that main flow net of the first heat exchanger is configured to receive an entirety of the producer gas from the main flow path.

25. The system of claim 22, comprising a plurality of scrubbers disposed along the main flow path downstream from the first heat exchanger and the second heat exchanger.

* * * * *